United States Patent
Kim et al.

(10) Patent No.: US 10,858,047 B2
(45) Date of Patent: Dec. 8, 2020

(54) METHOD OF MANUFACTURING PARTITION PANEL FOR VEHICLES

(71) Applicants: Hyundai Motor Company, Seoul (KR); Hanwha Solutions Corporation, Seoul (KR); Kia Motors Corporation, Seoul (KR)

(72) Inventors: Min Soo Kim, Suwon-si (KR); Wook Hyun Han, Seoul (KR); Chang Dong Kim, Suwon-si (KR); Jun Hyoung Kim, Seongnam-si (KR); Jun Young Kim, Hwaseong-si (KR); Sang Sun Park, Anyang-si (KR); Joung Myung Lim, Sejong (KR); Ji Hwan Choi, Sejong (KR); Hee Young Ko, Sejong (KR)

(73) Assignees: Hyundai Motor Company, Seoul (KR); Kia Motors Corporation, Seoul (KR); Hanwha Solutions Corporation, Seoul (KR)

( * ) Notice: Subject to any disclaimer, the term of this patent is extended or adjusted under 35 U.S.C. 154(b) by 17 days.

(21) Appl. No.: 16/247,763

(22) Filed: Jan. 15, 2019

(65) Prior Publication Data
US 2019/0144045 A1 May 16, 2019

Related U.S. Application Data

(62) Division of application No. 15/370,251, filed on Dec. 6, 2016, now Pat. No. 10,214,245.

(30) Foreign Application Priority Data

Oct. 21, 2016 (KR) .................. 10-2016-0137799

(51) Int. Cl.
*B60R 21/02* (2006.01)
*B62D 25/08* (2006.01)
(Continued)

(52) U.S. Cl.
CPC .......... *B62D 25/087* (2013.01); *B60R 21/026* (2013.01); *B62D 29/005* (2013.01); *B62D 29/043* (2013.01)

(58) Field of Classification Search
CPC ......... Y10T 29/49616; Y10T 29/49622; Y10T 29/49629; B29C 70/34; B29C 70/545
See application file for complete search history.

(56) References Cited

U.S. PATENT DOCUMENTS

| 4,375,898 A | 3/1983 | Stephens |
| 7,721,443 B2 * | 5/2010 | Preijert ............... B21C 37/0803 29/447 |

FOREIGN PATENT DOCUMENTS

| EP | 2100719 A1 * | 9/2009 | ............. C04B 38/00 |
| EP | 2100719 A1 | 9/2009 | |

(Continued)

OTHER PUBLICATIONS

KR-20160076300-A (Year: 2016).*

*Primary Examiner* — Jason L Vaughan
*Assistant Examiner* — Amanda Kreiling
(74) *Attorney, Agent, or Firm* — Slater Matsil, LLP (57) ABSTRACT

Disclosed are a partition panel for vehicles and a method of manufacturing the same. The method includes mounting a first prepreg formed to have a shape corresponding to a molding groove on a lower die provided with the molding groove. The molding groove is inclined upwards from the center of a lower portion of the lower die to opposite ends of the lower die. A second prepreg having a sheet type is mounted on the lower die so as to cover the first prepreg. The first prepreg and the second prepreg are integrally molded by placing an upper die on the lower die.

20 Claims, 7 Drawing Sheets

(51) Int. Cl.
*B62D 29/04* (2006.01)
*B62D 29/00* (2006.01)

(56) References Cited

FOREIGN PATENT DOCUMENTS

| | | | |
|---|---|---|---|
| JP | 09221876 A | | 8/1997 |
| JP | 2000229584 A | | 8/2000 |
| JP | 2012214199 A | | 11/2012 |
| JP | 2014201110 A | | 10/2014 |
| KR | 1020080053013 A | | 6/2008 |
| KR | 20160076300 A | * | 6/2016 |
| KR | 1020160076300 A | | 6/2016 |

* cited by examiner

METHOD OF MANUFACTURING PARTITION PANEL FOR VEHICLES

CROSS-REFERENCE TO RELATED APPLICATIONS

This application is a divisional application of U.S. patent application Ser. No. 15/370,251, filed on Dec. 6, 2016, which claims the priority benefit of Korean Patent Application No. 10-2016-0137799, filed in the Korean Intellectual Property Office on Oct. 21, 2016, which applications are hereby incorporated herein by reference.

TECHNICAL FIELD

The present invention relates to a partition panel for vehicles.

BACKGROUND

In a conventional partition panel for vehicles, a portion of a panel-type main body formed of a metal, which requires reinforcement, is partially reinforced. As circumstances require, a reinforcement body formed of a composite material including reinforced fibers and a resin is attached to the panel-type main body or is molded integrally with the main body.

However, the main body formed of a metal is used and, thus, it is difficult to achieve vehicle frame weight reduction due to increase in weight and, if a reinforcement body formed of a composite material is connected to the main body, defoliation caused by impact due to combination between different kinds of materials, etc. occurs.

The above description has been provided to aid in understanding of the background of the present invention and should not be interpreted as conventional technology known to those skilled in the art.

SUMMARY

Embodiments of the present invention relates to a partition panel for vehicles in which a reinforcement part formed of a composite material is connected integrally to a panel part formed of a composite material so as to effectively reinforce a position requiring strength and rigidity.

Embodiments of the present invention provide a partition panel for vehicles in which a reinforcement part formed of a composite material is connected integrally to a panel part formed of a composite material so as to effectively reinforce a position requiring strength and rigidity.

In accordance with an aspect of the present invention, partition panel for vehicles can include a panel part formed of a composite material to divide a trunk and the inside of a vehicle from each other, and a reinforcement part formed of a composite material, inclined upwards from the center of the lower portion of the panel part to both ends of the panel part, and connected integrally to the panel part.

The reinforcement part may include a main body region connected to the center of the lower portion of the panel part and a pair of deployment regions extending from the main body region so as to be inclined upwards to both ends of the panel part, and connection parts between the deployment regions and both ends of the main body region may be configured such that the width of the connection parts is gradually decreased in the downward direction and is then increased.

The panel part and the reinforcement part may be configured such that a plurality of reinforced fiber layers having a designated arrangement direction is stacked to form a multilayer structure, and the reinforced fiber arrangement directions of the reinforced fiber layers of the panel part and the reinforced fiber arrangement directions of the reinforced fiber layers of the reinforcement part may be different by an angle of 40-50°.

The reinforcement part may include a first reinforcement tape connected to a portion of the panel part inclined upwards from the center of the lower portion of the panel part to one end of the panel part, and a second reinforcement tape overlapping the first reinforcement tape at the center of the lower portion of the panel part and connected to a portion of the panel part inclined upwards from the center of the lower portion of the panel part to the other end of the panel part.

The first reinforcement tape and the second reinforcement tape may have the same shape, and an adhesive surface of the first reinforcement tape contacting the panel part and an adhesive surface of the second reinforcement tape contacting the panel part may be opposite.

The first reinforcement tape and the second reinforcement tape may be configured such that a plurality of reinforced fiber layers having a designated arrangement direction is stacked to form a multilayer structure.

The reinforced fiber arrangement direction of the reinforced fiber layer of the first reinforcement tape contacting the panel part from a virtual line being parallel with the height direction of the panel part may be parallel with or vertical to the reinforced fiber arrangement direction of the reinforced fiber layer of the second reinforcement tape contacting the panel part from the virtual line.

A pair of the reinforced fiber layers contacting each other and having the same reinforced fiber arrangement direction may serve as a reference pair and be disposed at the central layer of the first reinforcement tape or the second reinforcement tape, the reinforced fiber layers stacked on the upper and lower surfaces of the reference pair may form a plurality of pairs, and the pairs of the reinforced fiber layers stacked on the upper and lower surfaces of the reference pair may form a multilayer structure.

The reinforced fiber arrangement directions of the reinforced fiber layers in odd-numbered pairs stacked on the upper and lower surfaces of the reference pair may be equal so as to be vertical to the reinforced fiber arrangement direction of the reference pair, and the reinforced fiber arrangement directions of the reinforced fiber layers in even-numbered pairs stacked on the upper and lower surfaces of the reference pair may be equal so as to be parallel with the reinforced fiber arrangement direction of the reference pair.

The first reinforcement tape and the second reinforcement tape may be connected so as to intersect each other, the intersecting portions thereof may overlap each other, one end of each of the first reinforcement tape and the second reinforcement tape about the overlapping portions may be connected to the upper portion of the panel part, and the other end of each of the first reinforcement tape and the second reinforcement tape may be connected to the lower portion of the panel part.

The composite materials forming the panel part and the reinforcement part may include carbon fibers and, thus, the panel part may be formed of carbon fiber reinforced plastic (CFRP).

The composite materials forming the panel part and the reinforcement part may include glass fibers and, thus, the panel part may be formed of glass fiber reinforced plastic (GFRP).

The composite material forming the panel part may include carbon fibers and, thus, the panel part may be formed of carbon fiber reinforced plastic (CFRP), and the composite material forming the reinforcement part may include glass fibers and, thus, the reinforcement part may be formed of glass fiber reinforced plastic (GFRP).

The composite material forming the panel part may include glass fibers and, thus, the panel part may be formed of glass fiber reinforced plastic (GFRP), and the composite material forming the reinforcement part may include carbon fibers and, thus, the reinforcement part may be formed of carbon fiber reinforced plastic (CFRP).

In accordance with another aspect of the present invention, there is provided a method of manufacturing a partition panel for vehicles including mounting first prepreg formed to have a shape corresponding to a molding groove on a lower die provided with the molding groove inclined upwards from the center of the lower portion thereof to both ends thereof and mounting second prepreg having a sheet type on the lower die so as to cover the first prepreg, and integrally molding the first prepreg and the second prepreg by placing an upper die on the lower die.

The first prepreg may include a first tape mounted at one portion of the molding groove inclined upwards from the center of the lower portion thereof to one end thereof and a second tape mounted at the other portion of the molding groove inclined upwards from the center of the lower portion thereof to the other end thereof, and, in mounting of the first prepreg and the second prepreg on the lower die, the first tape may be mounted in the mounting groove and then the second tape may be mounted in the mounting groove so as to intersect the first tape at the center of the lower portion of the molding groove.

The first tape and the second tape may have the same shape, the molding groove may be bilaterally symmetrical, and, in mounting of the first prepreg and the second prepreg on the lower die, a designated surface of the second tape corresponding to a designated surface of the first tape contacting the lower die may face the upper mold.

The method may further include, after integrally molding of the first prepreg and the second prepreg, ejecting the integrally molded first prepreg and second prepreg from the upper and lower dies and then trimming unnecessary portions of the first prepreg and the second prepreg.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
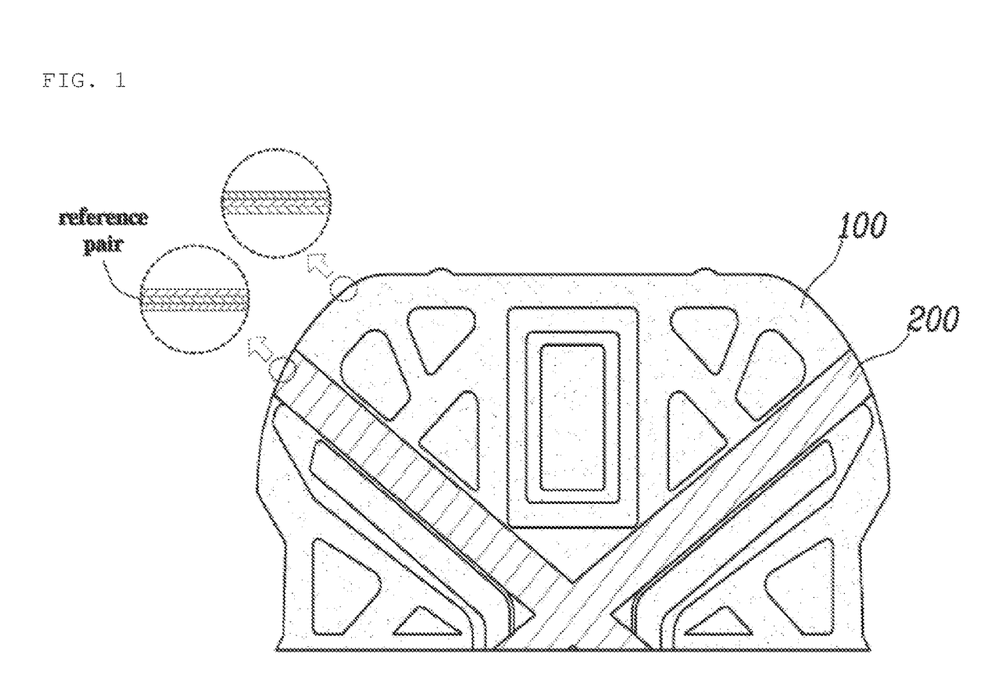
FIG. 1 is a plan view of a partition panel for vehicles in accordance with one embodiment of the present invention.
Figure 2:
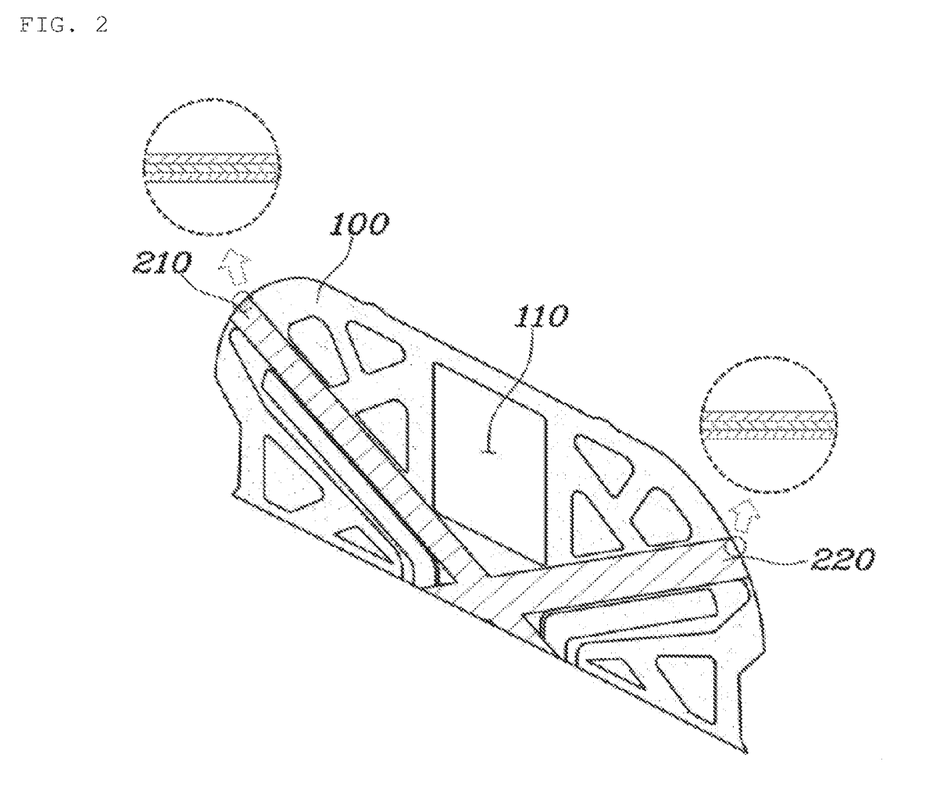
FIG. 2 is a perspective view of the partition panel for vehicles in accordance with one embodiment of the present invention.

With reference to FIGS. 1 and 2, a partition panel for vehicles in accordance with the present invention includes a panel part 100 formed of a composite material to divide a trunk and the inside of a vehicle from each other, and a reinforcement part 200 formed of a composite material, having a shape inclined upwards from the center of the lower portion of the panel part 100 to both ends of the panel part 100, and connected integrally to the panel part 100.

The panel part 100 is disposed at the side of a back seat of the vehicle and may execute a function of dividing the trunk and the interior of the vehicle from each other. The panel part 100 is formed of a composite material including reinforced fibers and a resin. Here, the reinforced fibers may mean at least one kind of fibers selected from carbon fibers, glass fibers, aramid fibers and natural fibers. Further, the resin may be a thermosetting resin, such as polypropylene (PP) or polyethylene (PE), or a thermoplastic resin, such as polyurethane (PU). However, the disclosure is not limited thereto.

A through hole 110 is formed through the central portion of the panel part 100 and, thus, ski equipment, etc. loaded in the trunk may be accommodated within the interior of the vehicle through the through hole 110.

Figure 3:
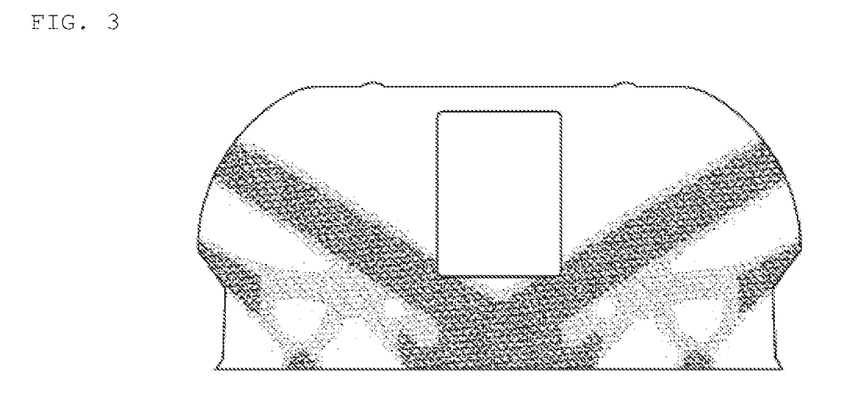
FIG. 3 is a view illustrating a portion of the partition panel for vehicles requiring reinforcement of strength and rigidity.

The reinforcement part 200 serves to reinforce the panel part 100 and may be connected to at least one of both surfaces of the panel part 100. FIG. 3 illustrates a portion of a partition panel generally applied to vehicles, requiring reinforcement of strength and rigidity. Therefore, the lower portion of the partition panel requires more reinforcement of strength and rigidity than the upper portion of the partition panel.

According to the position of the portion of the partition panel requiring reinforcement of strength and rigidity, the reinforcement part 200 may have a V shape which is inclined upwards from the center of the lower portion of the panel part 100 to both ends of the panel part 100.

In the same manner as the panel part 100, the reinforcement part 200 is formed of a composite material including reinforced fibers and a resin. Here, the reinforced fibers may mean at least one kind of fibers selected from carbon fibers, glass fibers, aramid fibers and natural fibers. Further, the resin may be a thermosetting resin, such as polypropylene (PP) or polyethylene (PE), or a thermoplastic resin, such as polyurethane (PU). However, the disclosure is not limited thereto.

When the partition panel for vehicles including the panel part 100 and the reinforcement part 200 to reinforce the panel part 100 is manufactured, both the panel part 100 and the reinforcement part 200 are mounted in a mold and then molded together and, thereby, the panel part 100 and the reinforcement part 200 may be integrally formed.

Differently from a conventional partition panel for vehicles, in case of the partition panel for vehicles in accordance with the present invention, both the panel part 100 and the reinforcement part 200 are formed of composite materials and connected integrally to each other and may thus reduce the weight of a vehicle frame and achieve high strength and rigidity.

Figure 4:
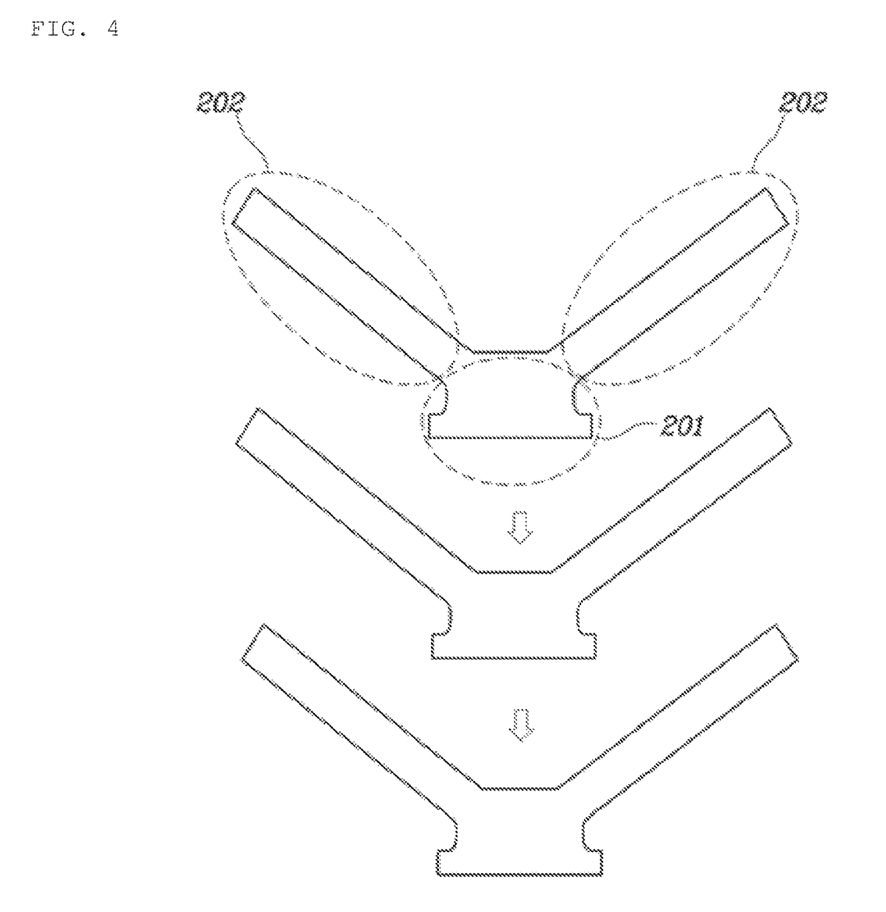
FIG. 4 is a view illustrating a reinforcement part in accordance with one embodiment of the present invention.

With reference to FIG. 4, the reinforcement part 200 may include a main body region 201 connected to the center of the lower portion of the panel part 100 and a pair of deployment regions 202 extending to be inclined upwards from the main body region 201 to both ends of the panel part 100, and connection parts disposed between the deployment regions 202 and both ends of the main body region 201 are configured such that the width of the connection parts is gradually decreased in the downward direction and is then increased.

The main body region 201 corresponds to a portion of the reinforcement part 200, which is connected to the center of the lower portion of the panel part 100, and the deployment regions 202 correspond to portions of the reinforcement part 200, which extend to be inclined from the main body region 201 to both ends of the panel part 100.

The main body region 201 and the deployment regions 202 correspond to regions provided to cover a portion of the partition panel for vehicles, requiring reinforcement of strength and rigidity, as exemplarily shown in FIG. 3.

The deployment regions 202 have a tape shape having a designated thickness and extend from the main body region 201. The connection parts between the deployment regions 202 and both ends of the main body region 201 are configured such that the width of the connection parts is gradually decreased in the downward direction and is then increased.

Here, the width direction may correspond to the width direction of a vehicle frame when the partition panel for vehicles is applied to the vehicle frame.

By forming waist parts having a width which is gradually decreased in the downward direction and is then increased, the reinforcement part 200 may cover the entirety of the portion requiring reinforcement shown in FIG. 3 and the overall weight of the partition panel for vehicles may be reduced due to removal of unnecessary parts.

The panel part 100 and the reinforcement part 200 may be configured such that a plurality of reinforced fiber layers having a designated arrangement direction is stacked to form a multilayer structure and the reinforced fiber arrangement directions of the reinforced fiber layers of the panel part 100 and the reinforced fiber arrangement directions of the reinforced fiber layers of the reinforcement part 200 are different by an angle of 40-50°, as illustrated by blown up portions shown in the dotted circles of FIG. 1.

The panel part 100 and the reinforcement part 200 may be formed of prepreg in which reinforced fibers are preliminarily impregnated with a resin. Such prepreg may be formed to have a multilayer structure in which a plurality of reinforced fiber layers having a designated arrangement direction is stacked.

The reinforced fiber layer may be formed to have a designated arrangement direction, i.e., unidirectional (UD), or formed as a woven fabric. Here, an angle formed by the reinforced fiber arrangement directions of the reinforced fiber layers of the panel part 100 and the reinforced fiber arrangement directions of the reinforced fiber layers of the reinforcement part 200 may be 40-50°, particularly 45°.

For example, in case of the panel part 100, reinforced fiber layers may be alternately stacked from the bottom at stacking angles of 0°, 90°, 90° and 0° from a virtual line being parallel with the height direction of the panel part 100. Here, the height direction of the panel part 100 may correspond to the height direction of the vehicle frame to which the partition panel for vehicles is applied.

Further, in case of the reinforcement part 200, reinforced fiber layers may be alternately stacked from the bottom at stacking angles of 45°, −45°, 45°, −45°, 45°, −45°, 45° and −45° from the virtual line being parallel with the height direction of the panel part 100. More particularly, in order to prevent warpage of the partition panel for vehicles in accordance with the present invention, the reinforced fiber layers may be alternately stacked from the bottom at stacking angles of 45°, −45°, 45°, −45°, −45°, 45°, −45° and 45° from the virtual line. This will be described in detail later.

There is a difference of an angle of 45° between the reinforced fiber layer of the panel part 100 having a stacking angle of 0° and the reinforced fiber layer of the reinforcement part 200 having a stacking angle of 45° or −45° and there is a difference of an angle of 45° between the reinforced fiber layer of the panel part 100 having a stacking angle of 90° and the reinforced fiber layer of the reinforcement part 200 having a stacking angle of 45° or −45°. Therefore, the reinforced fiber arrangement directions of the reinforced fiber layers of the panel part 100 and the reinforced fiber arrangement directions of the reinforced fiber layers of the reinforcement part 200 have a difference of an angle of 40-50°.

As described above, the reinforced fiber layers of the panel part 100 and the reinforced fiber layers of the reinforcement part 200 are disposed with a difference of an angle of 40-50° so as to maximally intersect each other, and thus the partition panel for vehicles may cope with impact in various directions and have improved strength and rigidity.

If such a difference is less than 40° or exceeds 50°, intersecting effects are reduced and improvement in strength and rigidity of the partition panel for vehicles is insignificant. Therefore, the panel part 100 and the reinforcement part 200 are controlled such that the reinforced fiber arrangement directions of the reinforced fiber layers of the panel part 100 and the reinforced fiber arrangement directions of the reinforced fiber layers of the reinforcement part 200 have a difference of an angle of 40-50°.

Particularly, the reinforcement part 200 may include a first reinforcement tape 210 connected to a portion of the panel part 100 inclined upwards from the center of the lower portion of the panel part 100 to one end of the panel part 100, and a second reinforcement tape 220 overlapping the first reinforcement tape 210 at the center of the lower portion of the panel part 100 and connected to a portion of the panel part 100 inclined upwards from the center of the lower portion of the panel part 100 to the other end of the panel part 100.

The first reinforcement tape 210 corresponds to a portion connected to the portion of the panel part 100 inclined upwards from the center of the lower portion of the panel part 100 to one end of the panel part 100, and the second reinforcement tape corresponds to a portion connected to the portion of the panel part 100 inclined upwards from the center of the lower portion of the panel part 100 to the other end of the panel part 100.

The first reinforcement tape 210 and the second reinforcement tape 220 partially contact each other so as to overlap each other at the center of the lower portion of the panel part 100. The upper surface of the first reinforcement tape 210 may contact the lower surface of the second reinforcement tape 220, or the lower surface of the first reinforcement tape 210 may contact the upper surface of the second reinforcement tape 220.

Here, such a contact region may be the main body region 201, and regions extending from the main body region 201 to both ends of the panel part 100 may be the deployment regions 202. Further, the contact region may have parts, the width of which is gradually decreased in the downward direction and is then increased.

If the first reinforcement tape 210 and the second reinforcement tape 220 are formed so as to intersect each other, portions extending to be inclined upwards from the contact region between the first and second reinforcement tapes 210 and 220 to both ends of the panel part 100 may be the deployment regions 202, and the contact region and portions extending downwards from the contact region to both ends of the panel part 100 may correspond to the main body region 201.

Particularly, the second reinforcement tape 220 and the first reinforcement tape 210 may have the same shape, an adhesive surface of the first reinforcement tape 210 contacting the panel part 100 and an adhesive surface of the second reinforcement tape 220 contacting the panel part 100 may be opposite.

Figure 5:
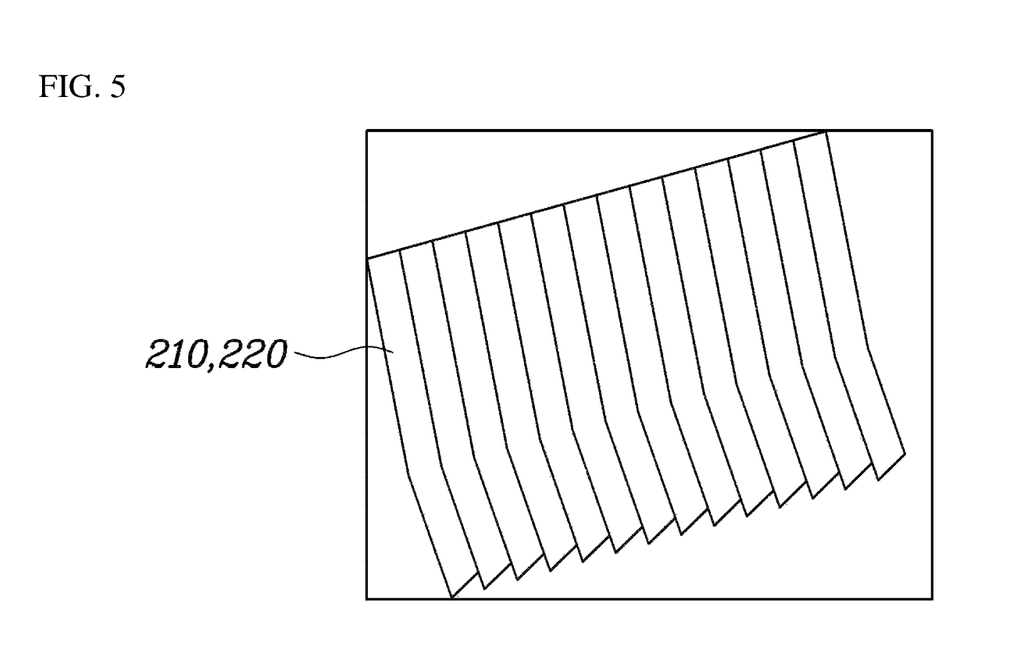
FIG. 5 is a view illustrating first and second reinforcement tapes having the same shape, acquired from rectangular prepreg.

Since the first reinforcement tape 210 and the second reinforcement tape 220 have the same shape, the first reinforcement tape 210 and the second reinforcement tape 220 having the same shape may be acquired from one rectangular prepreg sheet, as exemplarily shown in FIG. 5. Therefore, space waste of the prepreg sheet is minimized and thus yield may be improved and productivity may be increased.

That is, by forming the first reinforcement tape 210 and the second reinforcement tape 220 having the same shape, the manufacturing process of the first reinforcement tape 210 and the second reinforcement tape 220 may be shortened.

When the first reinforcement tape 210 and the second reinforcement tape 220 are connected to the panel part 100, the first reinforcement tape 210 and the second reinforcement tape 220 may be symmetrical about a virtual line, which is parallel with the height direction of the panel part 100 and crosses the center of the panel part 100.

That is, when the partition panel for vehicles in accordance with the present invention is manufactured, a prepreg structure having the shape of the first reinforcement tape 210 and the second reinforcement tape 220 is primarily mounted on a mold die, another prepreg structure having the shape of the first reinforcement tape 210 and the second reinforcement tape 220, turned upside down, is secondarily mounted thereon, a prepreg structure having the shape of the panel part 100 is finally mounted thereon, and then these prepreg structures are molded. Thereby, the adhesive surface of the first reinforcement tape 210 contacting the panel part 100 and the adhesive surface of the second reinforcement tape 220 contacting the panel part 100 may be opposite.

Particularly, the first reinforcement tape 210 and the second reinforcement tape 220 may be configured such that a plurality of reinforced fiber layers having a designated arrangement direction is stacked to form a multilayer structure. This feature is illustrated, for example, in FIG. 2, which includes blow up portions of the first reinforcement tape 210 and the second reinforcement tape 220.

More particularly, the reinforced fiber arrangement direction of the reinforced fiber layer of the first reinforcement tape 210 contacting the panel part 100 from on a virtual line being parallel with the height direction of the panel part 100 may be parallel with or vertical to the reinforced fiber arrangement direction of the reinforced fiber layer of the second reinforcement tape 220 contacting the panel part 100 from the virtual line.

The first reinforcement tape 210 and the second reinforcement tape 220 may be formed of prepreg in which reinforced fibers are impregnated with a resin, and such prepreg may be formed to have a multilayer structure in which a plurality of reinforced fiber layers is stacked. Here, the reinforced fiber layer may be formed to have a designated arrangement direction, i.e., unidirectional (UD).

The adhesive surface of the first reinforcement tape 210 contacting the panel part 100 and the adhesive surface of the second reinforcement tape 220 contacting the panel part 100 may be opposite and thus the reinforced fiber arrangement direction of the reinforced fiber layer of the first reinforcement tape 210 having a designated arrangement direction and contacting the panel part 100 may be parallel with or vertical to the reinforced fiber arrangement direction of the reinforced fiber layer of the second reinforcement tape 220 having a designated arrangement direction and contacting the panel part 100.

For example, if first prepreg 20 is formed such that reinforced fiber layers thereof are alternately stacked from the bottom at angles of 45°, −45°, 45°, −45°, −45°, 45°, −45° and 45° from the virtual line and second prepreg 10 having the upside-down shape of the first prepreg 20 is formed such that reinforced fiber layers thereof are alternately stacked from the bottom at angles of 45°, −45°, 45°, −45°, −45°, 45°, −45° and 45° from the virtual line, the reinforced fiber arrangement direction of the reinforced fiber layer of the first reinforcement tape 210 contacting the panel part 100 is 45 and the reinforced fiber arrangement direction of the reinforced fiber layer of the second reinforcement tape 220 contacting the panel part 100 is 45°. Therefore, the reinforced fiber arrangement direction of the reinforced fiber layer of the first reinforcement tape 210 contacting the panel part 100 is parallel with the reinforced fiber arrangement direction of the reinforced fiber layer of the second reinforcement tape 220 contacting the panel part 100.

Otherwise, if the first prepreg 20 is formed such that the reinforced fiber layers thereof are alternately stacked from the bottom at angles of 45°, −45°, 45°, −45°, 45°, −45°, 45° and −45° from the virtual line and the second prepreg 10 having the upside-down shape of the first prepreg 20 is formed such that the reinforced fiber layers thereof are alternately stacked from the bottom at angles of −45°, 45°, −45°, 45°, −45°, 45°, −45° and 45° from the virtual line, the reinforced fiber arrangement direction of the reinforced fiber layer of the first reinforcement tape 210 contacting the panel part 100 is 45° and the reinforced fiber arrangement direction of the reinforced fiber layer of the second reinforcement tape 220 contacting the panel part 100 is −45°. Therefore, the reinforced fiber arrangement direction of the reinforced fiber layer of the first reinforcement tape 210 contacting the panel part 100 is vertical to the reinforced fiber arrangement direction of the reinforced fiber layer of the second reinforcement tape 220 contacting the panel part 100.

A pair of reinforced fiber layers contacting each other and having the same reinforced fiber arrangement direction serves as a reference pair and is disposed at the central layer of the first reinforcement tape 210 or the second reinforcement tape 220, reinforced fiber layers stacked on the upper and lower surfaces of the reference pair form pairs, and a plurality of pairs of the reinforced fiber layers stacked on the upper and lower surfaces of the reference pair may form a multilayer structure. This feature is illustrated in FIG. 4, layers being indicated by the arrows.

Here, the central layer may mean that a pair of reinforced fiber layers facing each other is stacked at the center of the multilayer structure of the first reinforcement tape 210 or the second reinforcement tape 220. As such, a pair of reinforced fiber layers facing each other and located at the central layer of the multilayer structure serves as the reference pair. The reinforced fiber layer stacked on the upper surface of the reference pair and the reinforced fiber layer stacked on the lower surface of the reference pair form a pair, the reinforced fiber layer stacked on the upper surface thereof and the reinforced fiber layer stacked on the lower surface thereof form another pair, and such a construction is repeated. Thereby, a plurality of pairs of reinforced fiber layers may form a multilayer structure.

More particularly, the reinforced fiber arrangement directions of reinforced fiber layers in odd-numbered pairs stacked on the upper and lower surfaces of the reference pair are equal so as to be vertical to the reinforced fiber arrangement direction of the reference pair, and the reinforced fiber arrangement directions of reinforced fiber layers in even-numbered pairs stacked on the upper and lower surfaces of the reference pair are equal so as to be parallel with the reinforced fiber arrangement direction of the reference pair.

The reinforced fiber arrangement directions of reinforced fiber layers in a first pair stacked on the upper and lower surfaces of the reference pair are equal so as to be vertical to the reinforced fiber arrangement direction of the reference pair, and the reinforced fiber arrangement directions of reinforced fiber layers in a second pair stacked on the first pair are equal so as to be parallel with the reinforced fiber arrangement direction of the reference pair.

Therefore, the reinforced fiber arrangement direction of an odd-numbered pair of reinforced fiber layers may vertical to the reinforced fiber arrangement direction of an even-numbered pair of reinforced fiber layers.

For example, each of the first reinforcement tape 210 and the second reinforcement tape 220 may include 8 reinforced fiber layers, which are alternately stacked from the bottom at angles of 45, −45°, 45°, −45°, −45°, 45°, −45° and 45°. Here, fourth and fifth reinforced fiber layers having a reinforced fiber arrangement direction of an angle of −45° may form a reference pair, a pair of third and sixth reinforced fiber layers and a pair of firth and eighth reinforced fiber layers may form odd-numbered pairs, and the reinforced fiber arrangement direction of the odd-numbered pairs may be vertical to the reinforced fiber arrangement direction of the reference pair. A pair of second and seventh reinforced fiber layers may form an even-numbered pair, and the reinforced fiber arrangement direction of the even-numbered pair may be parallel with the reinforced fiber arrangement direction of the reference pair.

The first reinforcement tape 210 and the second reinforcement tape 220 may be connected so as to intersect each other, the intersecting portions thereof may overlap each other, one end of each of the first reinforcement tape 210 and the second reinforcement tape 220 about the overlapping portions may be connected to the upper portion of the panel part 100, and the other end of each of the first reinforcement tape 210 and the second reinforcement tape 220 may be connected to the lower portion of the panel part 100.

As described above, if the first reinforcement tape 210 and the second reinforcement tape 220 are formed so as to intersect each other, portions extending to be inclined upwards from the contact region between the first and second reinforcement tapes 210 and 220 to both ends of the panel part 100 may be the deployment regions 202, and the contact region and portions extending downwards from the contact region to both ends of the panel part 100 may correspond to the main body region 201.

Composite materials forming panel part 100 and the reinforcement part 200 may include carbon fibers and, thus, the panel part 100 may be formed of carbon fiber reinforced plastic (CFRP).

Since carbon fibers are used to manufacture both the panel part 100 and the reinforcement part 200, the partition panel for vehicles in accordance with the present invention may be formed of CFRP.

Otherwise, composite materials forming the panel part 100 and the reinforcement part 200 may include glass fibers and, thus, the panel part 100 may be formed of glass fiber reinforced plastic (GFRP).

Since glass fibers are used to manufacture both the panel part 100 and the reinforcement part 200, the partition panel for vehicles in accordance with the present invention may be formed of GFRP.

A composite material forming the panel part 100 may include carbon fibers and, thus, the panel part 100 may be formed of CFRP, and a composite material forming the reinforcement part 200 may include glass fibers and, thus, the reinforcement part 200 may be formed of GFRP.

Since carbon fibers are used to manufacture the panel part 100 and glass fibers are used to manufacture the reinforcement part 200 and thus the panel part 100 and the reinforcement part 200 are respectively formed of CFRP and GFRP, a partition panel for vehicles formed of different kinds of reinforced fibers may be manufactured.

Otherwise, a composite material forming the panel part 100 may include glass fibers and, thus, the panel part 100 may be formed of GFRP, and a composite material forming the reinforcement part 200 may include carbon fibers and, thus, the reinforcement part 200 may be formed of CFRP.

Since glass fibers are used to manufacture the panel part 100 and carbon fibers are used to manufacture the reinforcement part 200 and thus the panel part 100 and the reinforcement part 200 are respectively formed of GFRP and CFRP, a partition panel for vehicles formed of different kinds of reinforced fibers may be manufactured.

Figure 6:
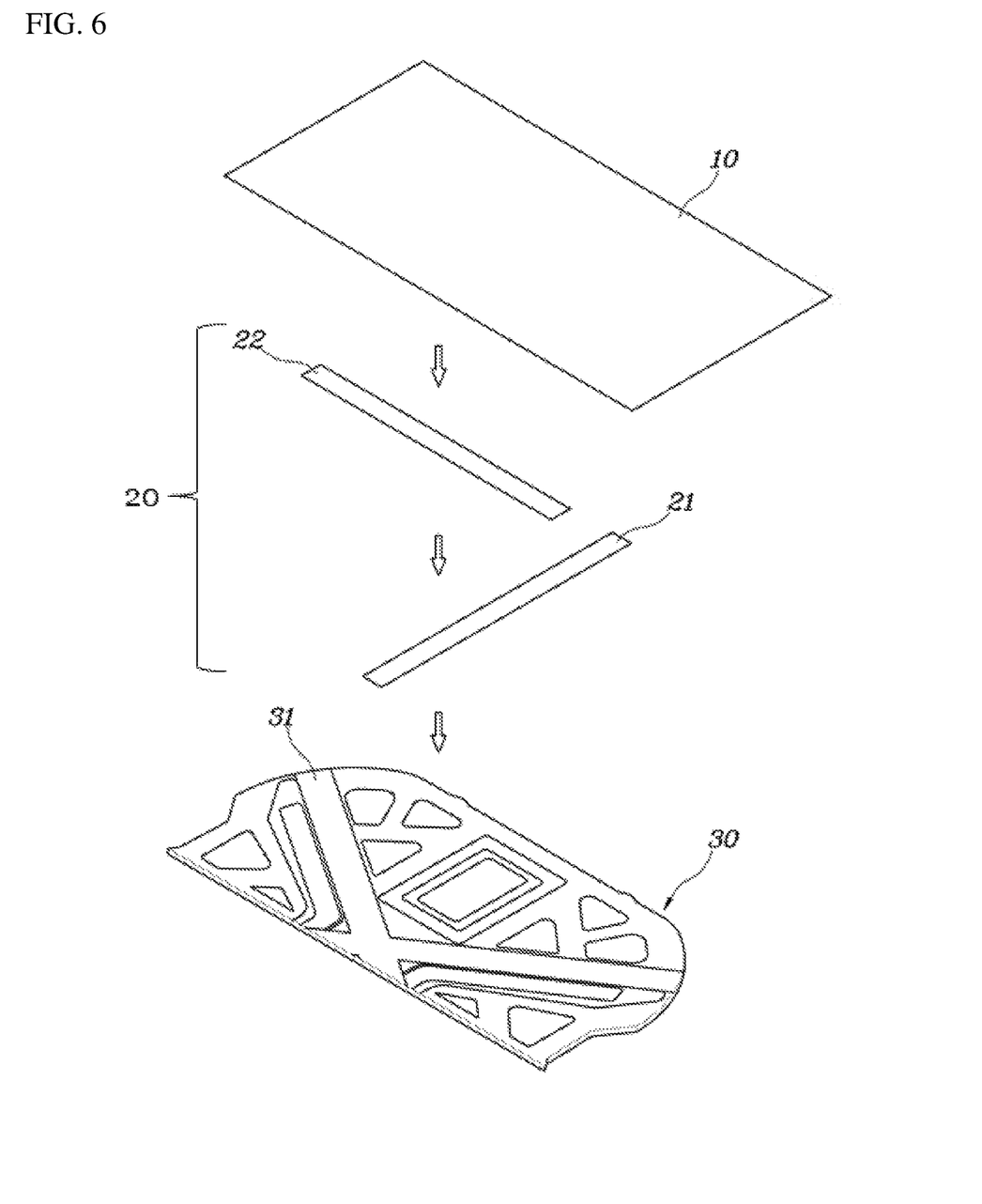
FIG. 6 is a view illustrating first prepreg and second prepreg sequentially mounted on a lower die.

With reference to FIG. 6, a method of manufacturing a partition panel for vehicles in accordance with the present invention includes mounting first prepreg 20, which includes first tape 21 and second tape 22 formed to have a shape corresponding to a molding groove 31 on a lower die 30 on which the molding groove 31 inclined upwards from the center of the lower portion of the lower die 30 to both ends of the lower die 30 and mounting second prepreg 10 having a sheet type on the lower die 30 so as to cover the first prepreg 20, and integrally molding the first prepreg 20 and the second prepreg 10 by placing an upper die on the lower die 30.

In mounting, the first prepreg 20 having the shape of the molding groove 31 is mounted on the lower die 30 provided with the molding groove 31. The molding groove 31 is inclined upwards from the center of the lower portion of the lower die 30 to both ends of the lower die 30. By mounting the first prepreg 20 having a shape corresponding to the molding groove 31 on the molding groove 31, the first prepreg 20 may not deviate from the proper position of the lower die 30.

The first prepreg 20 includes reinforced fibers preliminarily impregnated with a resin and the reinforced fibers may mean at least one kind of fibers selected from carbon fibers, glass fibers, aramid fibers and natural fibers. Further, the resin may be a thermosetting resin, such as polypropylene (PP) or polyethylene (PE), or a thermoplastic resin, such as polyurethane (PU). However, the disclosure is not limited thereto.

After mounting of the first prepreg 20 on the lower die 30, the second prepreg 10 is mounted on the first prepreg 20 so as to cover the first prepreg 20. The second prepreg 10 is a sheet type and corresponds to the panel part 100 of the partition panel for vehicles, which divides a trunk and the interior of a vehicle from each other. The first prepreg 20 has a shape corresponding to the shape of the molding groove 31 and is connected to the second prepreg 10, thus forming the reinforcement part 200.

In the same manner as the first prepreg 20, the second prepreg 10 includes reinforced fibers preliminarily impregnated with a resin and the reinforced fibers may mean at least one kind of fibers selected from carbon fibers, glass fibers, aramid fibers and natural fibers. Further, the resin may be a thermosetting resin, such as polypropylene (PP) or polyethylene (PE), or a thermoplastic resin, such as polyurethane (PU). However, the disclosure is not limited thereto.

After mounting of the first prepreg 20 and the second prepreg 10 on the lower die 30, the first prepreg 20 and the second prepreg 10 may be integrally molded by placing the upper die on the lower die 30. By integrally molding the first prepreg 20 and the second prepreg 10, a partition panel for vehicles, formed of the second prepreg 10 forming the panel part 100 and the first prepreg 20 forming the reinforcement part 200 and inclined upwards from the center of the lower portion of the second prepreg 10 to both ends of the second prepreg 10 and integrally connected, may be manufactured.

The first prepreg 20 may include a first tape 21 mounted at one portion of the molding groove 31 inclined upwards from the center of the lower portion of the molding groove 31 to one end of the molding groove 31 and a second tape 22 mounted at the other portion of the molding groove 31 inclined upwards from the center of the lower portion of the molding groove 31 to the other end of the molding groove 31 and, in mounting of the first prepreg 20 and the second prepreg 10 on the lower die 30, the first tape 21 is mounted in the molding groove 31 and then the second tape 22 is mounted in the molding groove 31 so as to intersect the first tape 21 at the center of the lower portion of the molding groove 31.

The first tape 21 is mounted at the portion of the molding groove 31 inclined upwards from the center of the lower portion of the molding groove 31 to one end of the molding groove 31 and is thus connected to a portion of the second prepreg 10 inclined upwards from the center of the lower portion of the second prepreg 10 to one end of the second prepreg 10, and the second tape 22 is mounted at the portion of the molding groove 31 inclined upwards from the center of the lower portion of the molding groove 31 to the other end of the molding groove 31 and is thus connected to a portion of the second prepreg 10 inclined upwards from the center of the lower portion of the second prepreg 10 to the other end of the second prepreg 10.

However, the first tape 21 and the second tape 22 partially contact each other so as to overlap each other at the center of the lower portion of the first prepreg 20. The upper surface of the first tape 21 may contact the lower surface of the second tape 22, or the lower surface of the first tape 21 may contact the upper surface of the second tape 22.

Figure 7:
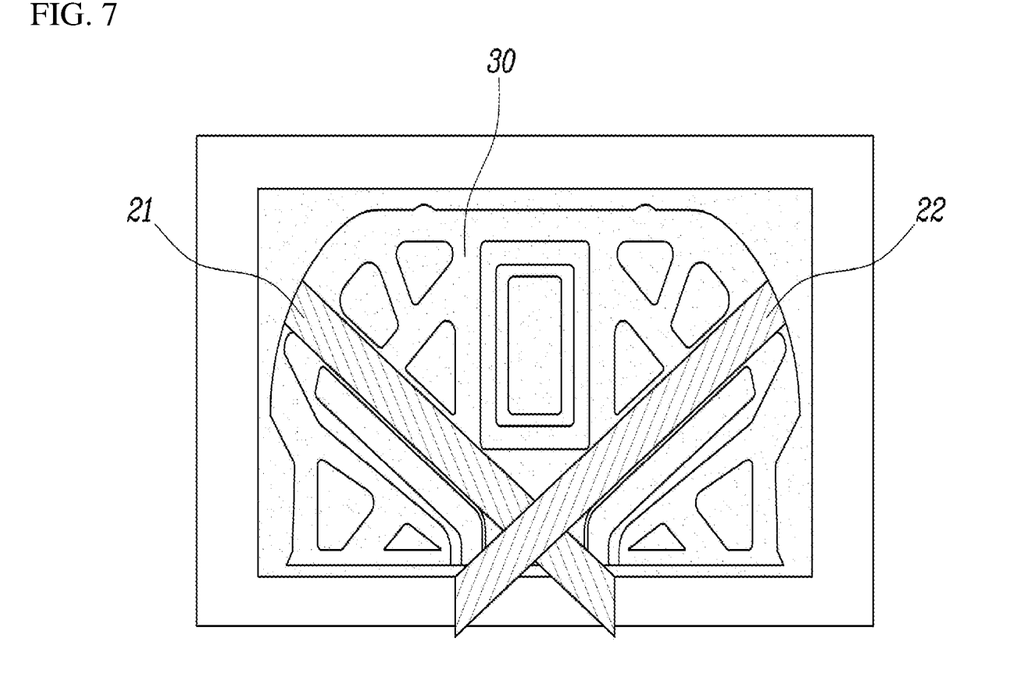
FIG. 7 is a view illustrating a first tape and a second tape sequentially mounted on the lower die.

With reference to FIG. 7, the first tape 21 and the second tape 22 may have the same shape, the molding groove 31 may be bilaterally symmetrical and, in mounting, a designated surface of the second tape 22 corresponding to a designated surface of the first tape 21 contacting the lower die 30 may face the upper mold.

Since the first tape 21 and the second tape 22 have the same shape, the first tape 21 and the second tape 22 having the same shape may be acquired from one rectangular prepreg sheet. Therefore, space waste of the prepreg sheet is minimized and thus yield may be improved and productivity may be increased.

The molding groove 31 is formed bilaterally symmetrically so as to be inclined upwards from the center of the lower portion of the lower die 30 to both ends of the lower die 30 and, in mounting, a plurality of prepreg layers having the same shape is primarily mounted at one portion of the molding groove 31 inclined upwards from the center of the lower portion of the lower die 30 to one end of the lower die 30 and a plurality of prepreg layers having the same shape is then mounted upside down at the other portion of the molding groove 31 inclined upwards from the center of the lower portion of the lower die 30 to the other end of the lower die 30, thereby completing mounting of the first prepreg 20.

Here, a designated surface of the second tape 22 corresponding to a designated surface of the first tape 21 contacting the lower die 30 may face the upper mold.

Figure 8:
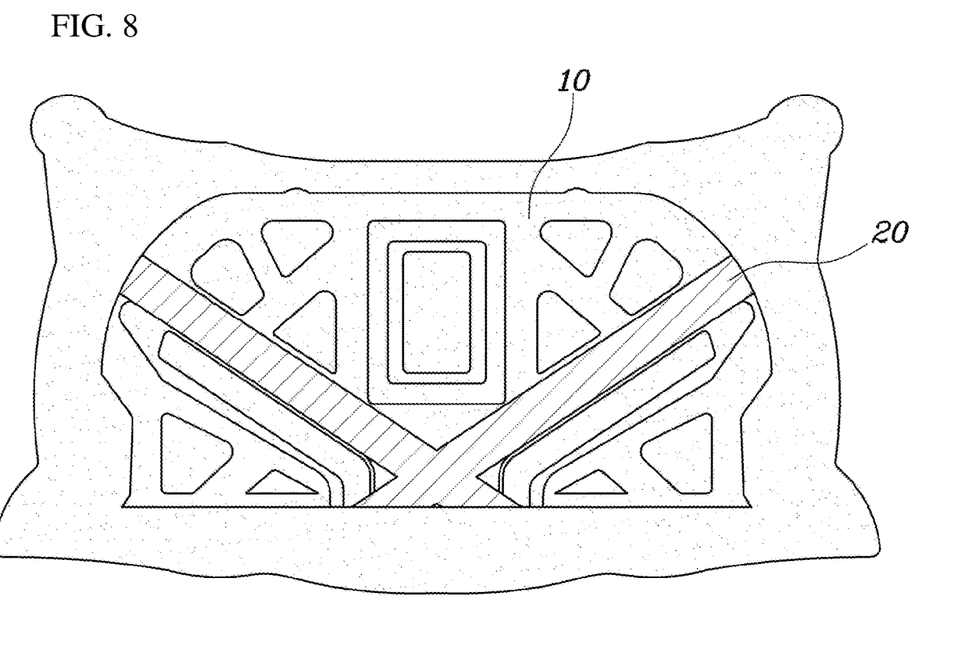
FIG. 8 is a view illustrating unnecessary portions of the integrally molded first prepreg and second prepreg, after molding.

With reference to FIG. 8, the method for manufacturing the partition panel for vehicles in accordance with the present invention may further include ejecting the integrally molded first prepreg 20 and second prepreg 10 and then trimming unnecessary portions of the first prepreg 20 and the second prepreg 10, after molding.

The integrally molded first prepreg 20 and second prepreg 10 are ejected from the molding dies and then unnecessary portions of the first prepreg 20 and the second prepreg 10 for the partition panel for vehicles are removed. Thereby, manufacture of the partition panel for vehicles in accordance with the present invention may be completed.

As is apparent from the above description, in a partition panel for vehicles in accordance with the present invention, a reinforcement part formed of a composite material is connected integrally to a panel part formed of a composite material, thus effectively reinforcing a position requiring strength and rigidity and achieving vehicle weight reduction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a partition panel of a vehicle, the method comprising:
   mounting a first prepreg formed to have a shape corresponding to a molding groove on a lower die provided with the molding groove, the molding groove inclined upwards from the center of a lower portion of the lower die to opposite ends of the lower die;
   mounting a second prepreg having a sheet type on the lower die so as to cover the first prepreg; and
   integrally molding the first prepreg and the second prepreg by placing an upper die on the lower die;
   wherein the first prepreg includes a first tape mounted at a first portion of the molding groove inclined upwards from the center of the lower portion thereof to one end of the lower die and a second tape mounted at a second portion of the molding groove inclined upwards from the center of the lower portion to an opposite end of the lower die; and wherein mounting the first prepreg and the second prepreg on the lower die comprises mounting the first tape in the molding groove and then mounting the second tape in the molding groove so as to intersect the first tape at the center of the lower portion of the molding groove.

2. The method according to claim 1, wherein the first tape and the second tape have substantially the same shape.

3. The method according to claim 2, wherein the first tape and the second tape are formed from one rectangular prepreg sheet.

4. The method according to claim 1, wherein the molding groove is bilaterally symmetrical.

5. The method according to claim 1, wherein, in mounting the first prepreg and the second prepreg on the lower die, a designated surface of the second tape corresponding to a designated surface of the first tape contacting the lower die faces the upper die.

6. The method according to claim 1, wherein:
the first tape and the second tape have substantially the same shape;
the molding groove is bilaterally symmetrical; and
in mounting the first prepreg and the second prepreg on the lower die, a designated surface of the second tape corresponding to a designated surface of the first tape contacting the lower die faces the upper die.

7. The method according to claim 1, further comprising, after integrally molding of the first prepreg and the second prepreg, ejecting the integrally molded first prepreg and second prepreg from the upper and lower dies and then trimming unnecessary portions of the first prepreg and the second prepreg.

8. The method of claim 1, wherein the first prepreg and the second prepreg are formed to have a multilayer structure having a plurality of reinforced fiber layers.

9. The method of claim 8, wherein the plurality of reinforced fiber layers is stacked in a designated arrangement direction.

10. The method of claim 8, wherein the plurality of reinforced fiber layers are formed as a woven fabric.

11. The method of claim 1, wherein the first prepreg includes reinforced fibers preliminarily impregnated with a resin, the reinforced fibers comprising fibers selected from the group consisting of carbon fibers, glass fibers, aramid fibers and natural fibers.

12. The method of claim 1, wherein the first prepreg includes reinforced fibers preliminarily impregnated with a thermosetting resin or a thermoplastic resin.

13. The method of claim 12, wherein the resin comprises a resin selected from the group consisting of polypropylene, polyethylene, and polyurethane.

14. A method of manufacturing a partition panel of a vehicle, the method comprising:
mounting a first prepreg formed to have a shape corresponding to a molding groove on a lower die provided with the molding groove, the molding groove inclined upwards from the center of a lower portion of the lower die to opposite ends of the lower die;
mounting a second prepreg having a sheet type on the lower die so as to cover the first prepreg; and
integrally molding the first prepreg and the second prepreg by placing an upper die on the lower die;
wherein after manufacture the partition panel comprises:
a panel part formed of a composite material to divide a trunk and the inside of the vehicle from each other, the panel part having a first end and a laterally spaced second end; and
a reinforcement part formed of a composite material, inclined upwards from the center of a lower portion of the panel part toward the first and second ends of the panel part, the reinforcement part being connected integrally to the panel part, the composite material of the panel part and the composite material of the reinforcement part being formed from the first prepreg and the second prepreg.

15. The method according to claim 14, wherein the reinforcement part includes:
a main body region connected to the center of the lower portion of the panel part;
a first deployment region extending from the main body region so as to be inclined upwards toward the first end of the panel part; and
a second deployment region extending from the main body region so as to be inclined upwards toward the second end of the panel part;
wherein connection parts between the first and second deployment regions and the first and second ends of the main body region are configured such that the connection parts each have a width that gradually decreases in a downward direction and then increases.

16. The method according to claim 14, wherein the reinforcement part includes:
a first reinforcement tape-shaped portion connected to a portion of the panel part inclined upwards from the center of the lower portion of the panel part to a first end of the panel part; and
a second reinforcement tape-shaped portion overlapping the first reinforcement tape-shaped portion at the center of the lower portion of the panel part and connected to a portion of the panel part inclined upwards from the center of the lower portion of the panel part to a second end of the panel part.

17. The method according to claim 16, wherein the first tape and the second tape have substantially the same shape.

18. The method according to claim 16, wherein the molding groove is bilaterally symmetrical.

19. The method according to claim 14, further comprising, after integrally molding of the first prepreg and the second prepreg, ejecting the integrally molded first prepreg and second prepreg from the upper and lower dies and then trimming unnecessary portions of the first prepreg and the second prepreg.

20. The method of claim 14, wherein the first prepreg and the second prepreg are formed to have a multilayer structure having a plurality of reinforced fiber layers.

* * * * *